United States Patent [19]

Bergstedt

[11] 3,792,273
[45] Feb. 12, 1974

[54] SCINTILLATION CAMERA WITH IMPROVED RESOLUTION

[75] Inventor: Lowell C. Bergstedt, Schaumburg, Ill.

[73] Assignee: G. al. Searle & Co., Chicago, Ill.

[22] Filed: Feb. 10, 1972

[21] Appl. No.: 225,055

[52] U.S. Cl. .......................................... 250/71.5 S
[51] Int. Cl. ............................................. G01t 1/20
[58] Field of Search ............................... 250/71.5 S

[56] References Cited
UNITED STATES PATENTS

| | | | |
|---|---|---|---|
| 3,631,244 | 12/1971 | Bergstedt | 250/71.5 S |
| 3,683,180 | 8/1972 | Martone et al. | 250/71.5 S |
| 3,549,887 | 12/1970 | Hansen | 250/71.5 S |
| 3,683,184 | 8/1972 | Brunnett et al. | 250/71.5 S |

Primary Examiner—James W. Lawrence
Assistant Examiner—Davis L. Willis
Attorney, Agent, or Firm—Charles H. Thomas, Jr.; Walter C. Ramm; Peter J. Sgarbossa

[57] ABSTRACT

An Anger-type scintillation camera system fitted with a gamma ray filter between the object under study and the detector and an output signal filter in the form of a funnel-type optical filter between the cathode ray tube of the detector and an image recording film. The gamma ray filter and funnel-type optical filter scan in synchronism so that the total radioactivity distribution in the object is documented on the film.

3 Claims, 6 Drawing Figures

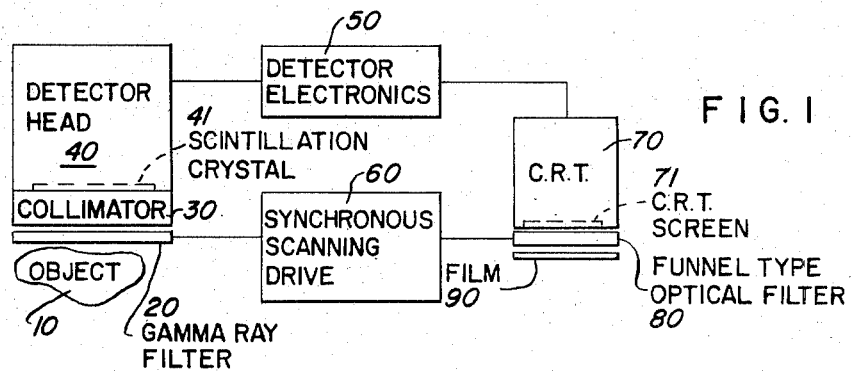
FIG. 1
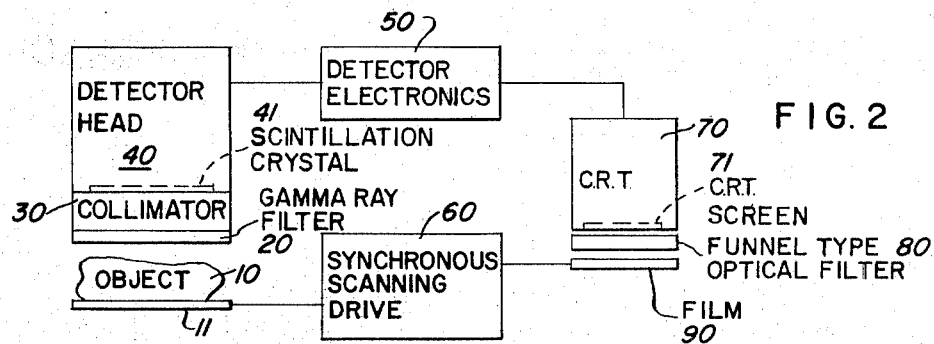
FIG. 2
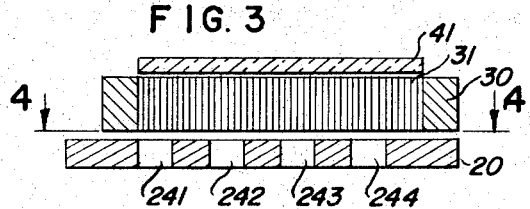
FIG. 3
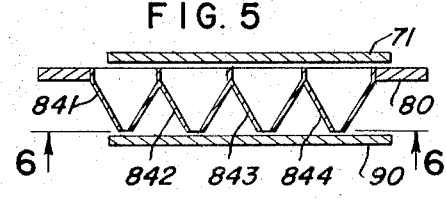
FIG. 5
FIG. 4
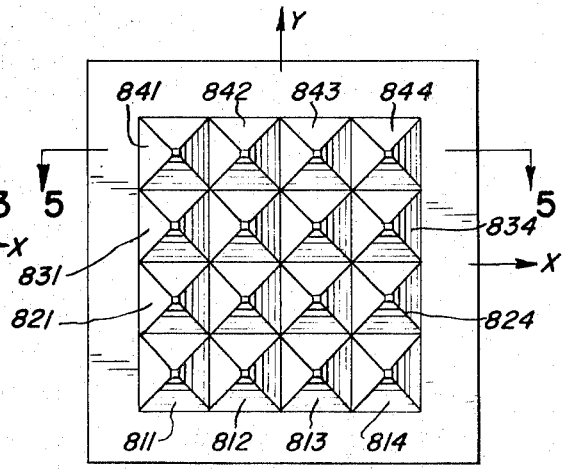
FIG. 6

3,792,273

SCINTILLATION CAMERA WITH IMPROVED RESOLUTION

Scintillation cameras, mainly Anger-type scintillation cameras (U. S. Pat. No. 3,011,057), are in widespread use in hospitals throughout the world. These cameras enable physicians and researchers to visualize static and dynamic distributions of radioactivity introduced into the human body and thereby to obtain useful diagnostic information which is often not provided by other imaging equipment or which can be obtained only at greater expense or greater risk to the patient.

In static gamma ray imaging of human organs such as the brain, lungs, thyroid, liver, spleen, kidneys, and pancreas, the spatial resolution of the scintillation camera is an inportant parameter in determining the degree to which structural detail of the organ can be differentiated by the camera in terms of variations in radioisotope concentrations. Other important parameters are efficiency of data acquisition, energy resolution, linearity, and uniformity of spatial and energy resolution and efficiency. In practice, in designing a scintillation camera system, trade-offs in these parameters must usually be made so that all of them fall within acceptable limits, although these limits are not presently well-defined or generally agreed upon. Most of the improvements in the state-of-the-art of scintillation camera design have been directed toward improving the spatial resolution while keeping other parameters constant or in some instance improving spatial resolution and one or more other parameters as well.

Larsson U. S. Patent Application, Ser. No. 190,618, filed Oct. 19, 1971, discloses an approach to improving the overall spatial resolution of a scintillation camera system which employs a radiation filter means interposed between an object containing a radioactivity distribution and a radiation sensitive transducer in the detector and a signal filtering means at the output of the detector which operates in conjunction with a documentation medium, such as photographic film. The Larsson patent application discloses signal filtering means either in the form of an optical filter having optical passageways corresponding in geometric arrangement to the radiation filter passageways or an electronic analog to the optical filter. While the embodiments disclosed in the Larsson patent application are capable of producing a substantial improvement in spatial resolution of a camera system, a large sacrifice in efficiency is produced because the radiation filter means reduces the number of radiation quanta emitted from the which are permitted to strike the radiation sensitive transducer and, more importantly, because the types of signal filtering means employed reduce the number of detected interaction events which are permitted to be documented.

Therefore, it is the principal object of this invention to provide an improved radioactivity imaging device of the general type disclosed in the Larsson patent application by employing an improved optical type output signal filter.

This invention features a Larsson-type imaging device in which an optical filter having funnel-type elements is employed to increase the number of detected events which are documented while still limiting documentation of events to limited areas on a documentation medium at positions corresponding to coordinates of intersection of the central axes of passageways in the radiation filter with the transducer. By increasing the number of detected events which are documented, the overall efficiency of a Larsson-type system is improved although some sacrifice in efficiency to achieve the resolution improvement remains.

Other features and advantages of this invention will be apparent from a consideration of the following description in conjunction with the accompanying drawings in which:

FIG. 1 is a block schematic diagram of one embodiment of this invention;

FIG. 2 is a block schematic diagram of another embodiment of this invention;

FIG. 3 is a section view of a portion of exemplary apparatus according to this invention;

FIG. 4 is an elevational view of an exemplary gamma ray filter in accordance with this invention;

FIG. 5 is a section view of a portion of exemplary apparatus according to this invention;

FIG. 6 is an elevational view of an exemplary funnel-type optical filter according to this invention.

Referring to FIG. 1, an object 10 containing a radioactivity distribution is positioned adjacent to a gamma ray filter 20 which in turn is movably mounted adjacent to a collimator 30 mounted on detector head 40. Collimator 30 is adjacent scintillation crystal 41 in detector head 40. Detector head 40, detector electronics 50, and cathode ray tube (CRT) 70 comprise an Anger-type radiation detector. A funnel-type optical filter 80 is movably mounted adjacent screen 71 in CRT 70 and a photographic recording film 90 receives and documents light flashes traversing filter 80. Synchronous scanning drive 60 scans gamma ray filter 20 and filter 80 in synchronous rectilinear rasters.

FIG. 2 shows a system like that in FIG. 1 except object 10 is supported on a movable table 11, gamma ray filter 20 and funnel-type optical filter 80 are mounted in fixed positions, and table 11 and film 90 are scanned in synchronism by synchronous scanning drive 60.

FIGS. 3 and 4 show an arrangement of gamma ray filter 20, collimator 30, and, transducer 41. Gamma ray filter 20 has a square array of square apertures therethrough, such as apertures 241, 242, 243, 244, and is constructed of radiation opaque material, such as lead, of a thickness sufficient to absorb substantially all radiation quanta emitted from an object placed adjacent to it except such as pass through said apertures. A four-by-four array of apertures is shown for ease of illustration whereas in an actual embodiment, up to a 32 by 32 array of apertures would be employed.

Collimator 30 has a large number (1,000 to 15,000 or more) of small channels 31 therethrough. Collimator 30 and gamma ray filter 20, together comprise a radiation filter defining a plurality of mutually spaced radiation passageways to crystal 41 for radiation quanta emitted from an object adjacent filter 20.

FIGS. 5 and 6 show an arrangement of CRT screen 71, funnel-type optical filter 80, and film 90. Filter 80 has an arrangement of optical passageways, such as 841, 842, 843, 844, each of which has a wide light admitting port adjacent screen 71 and a narrow light exiting port adjacent film 90. FIG. 6 shows that the configuration of funnels in optical filter 80 matches the configuration of apertures in gamma ray filter 20. Individual funnels in optical filter 80 conduct light from flashes occurring over a wide area on screen 71 to a small area on film 90. Each small area on film 90 has coordinates corresponding to coordinates of central axes of apertures in gamma ray filter 20. Thus a gamma ray which traverses aperture 241 in filter 20 and interacts with transducer 41 will produce a light flash on screen 71 at a position such that light from the flash will be funnelled through funnel 841 to be documented on film 90 in an area having coordinates corresponding to coordinates of the central axis of aperture 241.

Individual funnels in optical filter 80 may comprise simply pyramid shaped walls with light reflecting interiors or light conducting material may be employed to pipe and funnel the light from screen 71. As taught in the above mentioned Larsson application, the size of the apertures and the separation distance between apertures in gamma ray filter 20 are chosen in accordance with an intrinsic spatial resolution value (typically full width at half maximum) of the detector to produce a desired resolution value for the overall system.

It should be apparent from a comparison of the system of this invention with that disclosed in the Larsson application referenced above, that an improvement in efficiency results from the use of a funnel-type optical filter. The reason for the improvement is that more detected events which are registered on CRT screen 71 are permitted to be documented on film 90. At the same time, resolution improvement in accordance with the Larsson teaching is achieved because events are documented at positions corresponding closely to the origin of the gamma ray producing the event, thus bypassing the inherent resolution limitations of the detector.

It should be apparent that other configurations of apertures in gamma ray filter 20 and funnels in optical filter 80 could be employed. Round or hexagonal apertures and funnels could be employed in a hexagonal array. Another variation of this invention would involve a non-uniform distribution and size of light admitting ports of funnels in optical filter 80 (with a uniform distribution of light exiting ports) to compensate for known and premeasured spatial nonlinearities in an Anger-type detector. The system of FIG. 2 would be most useful in implementing such a variation since it employs radiation and optical filters which are stationary with respect to the transducer in the detector and the CRT screen, respectively, and the object and the film are scanned.

It should also be apparent that this invention is readily adaptable to systems in which a converging or diverging collimator is employed and to a system which performs tomography using rotating radiation and light collimators as shown in U. S. Pat. No. 3,631,244. In the latter system a rotating slanted channel radiation collimator would be employed between the gamma ray filter and the transducer and a synchronously rotating slanted channel light collimator would be employed between the CRT screen and the optical filter.

Other modifications than those described above could be made without departing from the scope of this invention as claimed in the following claims.

I claim:

1. Apparatus for imaging an object containing a radioactivity distribution comprising:

a radiation detector, including a radiation sensitive transducer, of the type producing an output representing coordinates of interaction of quanta of radiation with said transducer, said detector having a predetermined resolution value expressed in terms of full width at half maximum, said detector further including an output screen, said output comprising flashes of light each spatially located on said screen at coordinates corresponding to coordinates of interaction with said transducer of a particular quantum of radiation;

radiation filter means interposed between said transducer and said object for defining a plurality of mutually spaced radiation passageways to said transducer for radiation quanta emitted from said object;

a documentation medium;

a signal filtering means comprising a funnel-type optical filter interposed between said output screen and said documentation medium, said funnel-type optical filter defining a plurality of optical passageways to said documentation medium from said screen, each passageway having a wide light admitting port adjacent said screen and a narrow light exiting port adjacent said documentation medium, said optical passageways having a geometric arrangement corresponding to said radiation passageways;

scanning means for producing relative scanning between said object and said radiation filter means and a corresponding synchronous relative scanning between said documentation medium and said signal filtering means such that all of said object is exposed to said transducer through said radiation passageways;

the size and separation distance of said radaition passageways being preselected in terms of said full width at half maximum resolution value of said detector to produce a desired value of resolution of the overall apparatus.

2. Apparatus as claimed in claim 1, wherein said radiation filter means comprises:

a radiation filter movably mounted on said radiation detector between said object and said transducer; said filter comprising a flat plate of substantially radiation opaque material having a plurality of apertures therethrough and having a thickness sufficient to absorb substantially all radiation quanta emitted from said object toward said transducer except such quanta as pass through said apertures.

3. Apparatus for imaging an object containing a radioactivity distribution comprising:

a radiation detector having a scintillation crystal in the form of a thin disc, electronic circuitry for developing a pair of electrical signals corresponding to coordinates of interaction of a quantum of radiation with said crystal, and a cathode ray tube for registering a quanta of radiation interacting with said transducer as a flash of light located in accordance with said pair of electrical signals;

a radiation collimator mounted on said detector adjacent said scintillation crystal;

a radiation filter movably mounted on said detector adjacent said collimator, comprising a flat plate of substantially radiation opaque material having a regular array of mutually spaced apertures therethrough and having a thickness sufficient to absorb substantially all radiation quanta emitted from said object toward said transducer except such quanta as pass through said apertures;

a funnel-type optical filter movably mounted adjacent said cathode ray tube, comprising a regular array of light funneling elements in a regular array corresponding geometrically to said regular array of apertures in said radiation filter;

a light sensitive photographic film mounted to receive light from said optical filter; and scanning means for producing synchronous scanning of said radiation filter and said optical filter such that all of said object is exposed to said scintillation crystal and all of said film is exposed to said cathode ray tube;

the size and separation distance of said apertures in said radiation filter being preselected to produce a desired value of resolution of the overall apparatus.

* * * * *